W. F. FOLMER.
PANORAMIC CAMERA.
APPLICATION FILED JULY 24, 1915.

1,251,494.

Patented Jan. 1, 1918.
5 SHEETS—SHEET 1.

Inventor
William F. Folmer

W. F. FOLMER.
PANORAMIC CAMERA.
APPLICATION FILED JULY 24, 1915.

1,251,494.

Patented Jan. 1, 1918.
5 SHEETS—SHEET 2.

Witness
Walter B. Payne

Inventor
William F. Folmer
By
his Attorneys

W. F. FOLMER.
PANORAMIC CAMERA.
APPLICATION FILED JULY 24, 1915.
1,251,494.
Patented Jan. 1, 1918.
5 SHEETS—SHEET 3.
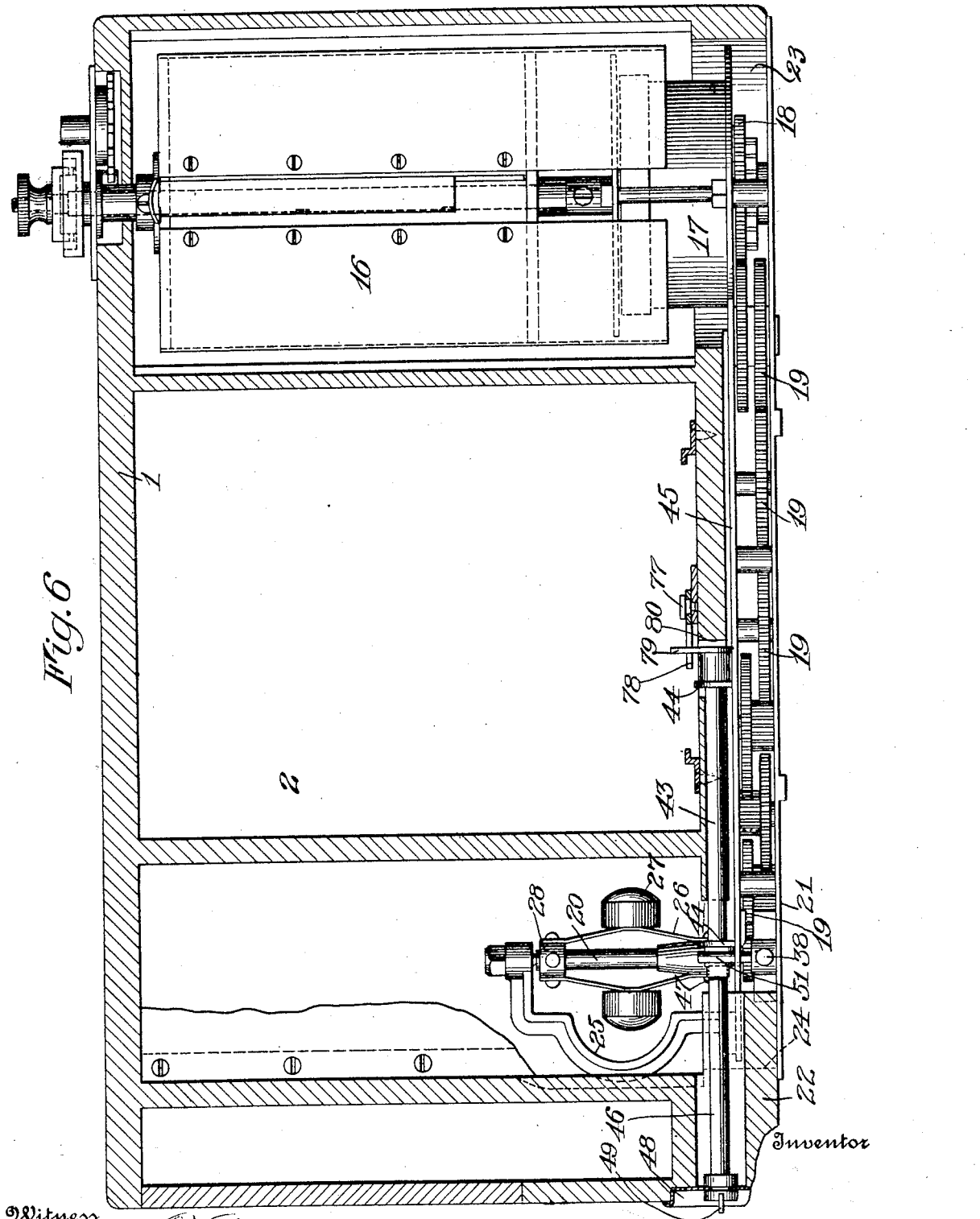
Fig. 6
Witness
Inventor
William F. Folmer
By
his Attorneys

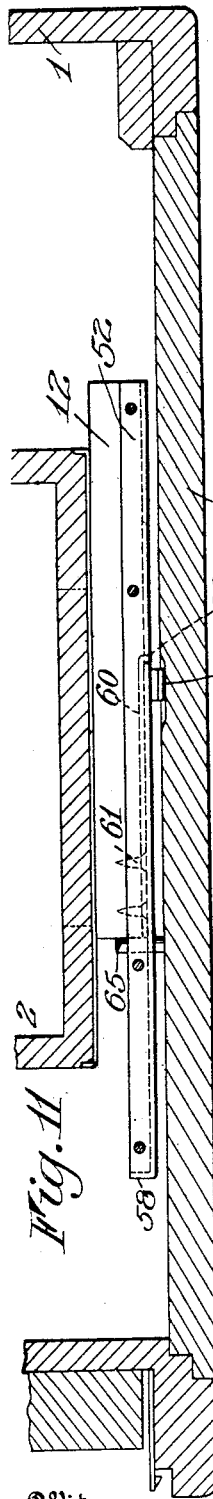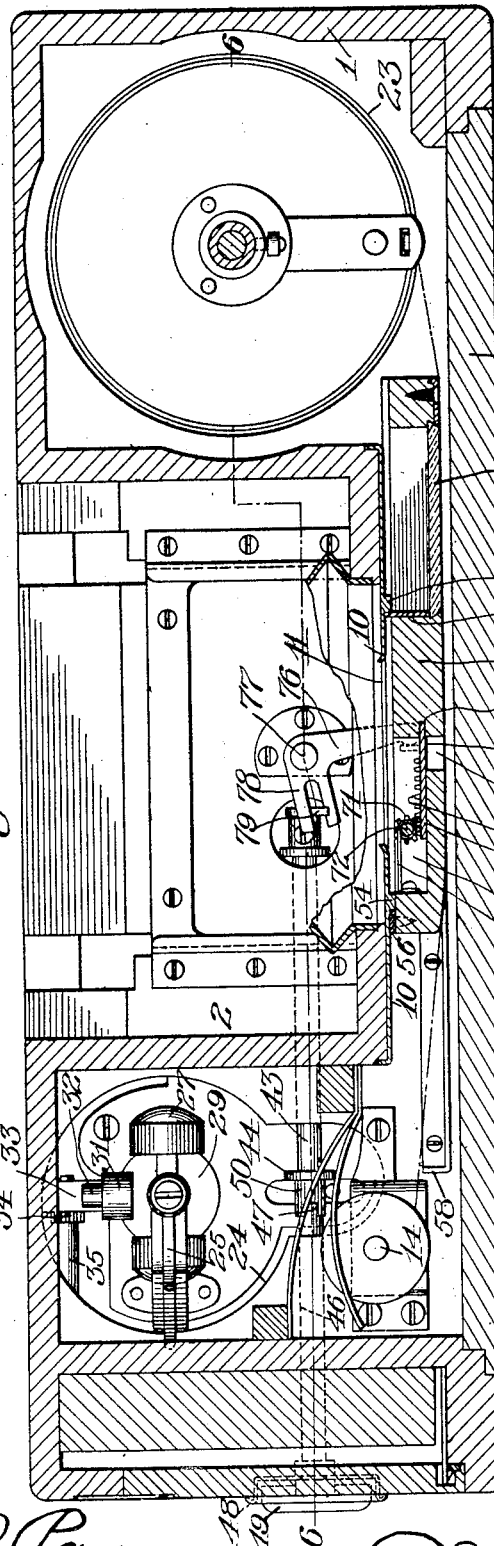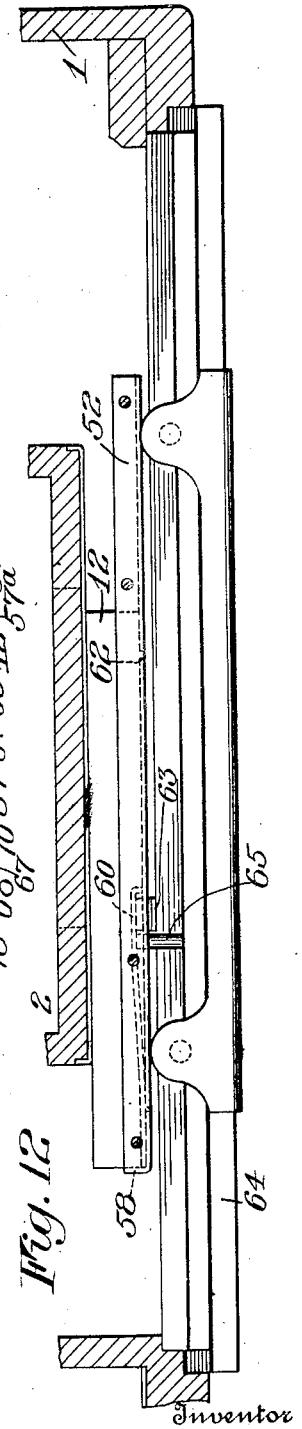

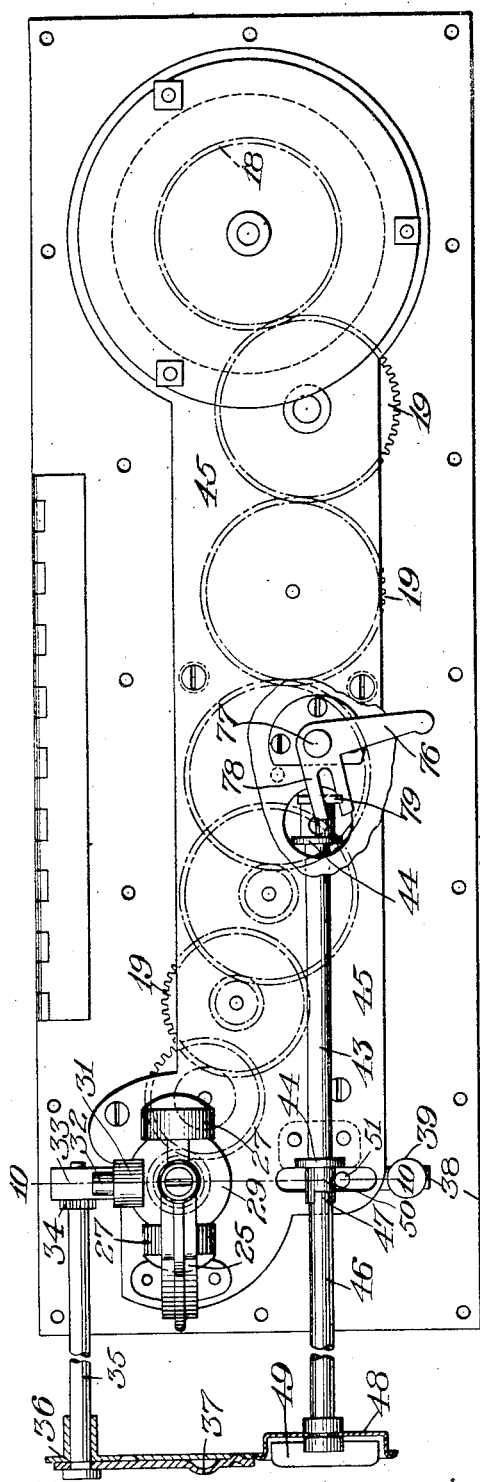

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

PANORAMIC CAMERA.

1,251,494.   Specification of Letters Patent.   Patented Jan. 1, 1918.

Application filed July 24, 1915. Serial No. 41,768.

*To all whom it may concern:*

Be it known that I, WILLIAM F. FOLMER, of Rochester, in the county of Monroe and State of New York, have invented certain new and useful Improvements in Panoramic Cameras; and I do hereby declare the following to be a full, clear, and exact description of the same, reference being had to the accompanying drawings, forming a part of this specification, and to the reference-numerals marked thereon.

My present invention relates to photography and more particularly to panoramic cameras of the type in which a sensitized strip is fed automatically across the focal plane or across the exposure aperture in timed relation to a sweeping movement of the lens across the subject through the rotation of the camera itself about a properly located center and the invention has for its object the general improvement of a structure of this character with particular reference to the means whereby the view is chosen, the exposure aperture is controlled and the various parts properly actuated to start the exposure. Simplicity, convenience and efficiency are sought and the invention is directed in part toward improvements whereby the operator is automatically restrained from inadvertently starting the exposing mechanism and performing other acts that would interfere with the proper functions of the parts and the success of the exposure generally. To these and other ends the invention resides in certain improvements and combinations of parts all as will be hereinafter more fully described, the novel features being pointed out in the claims at the end of the specification.

In the drawings:

Figure 1 is a top plan view of a panoramic camera constructed in accordance with and illustrating one embodiment of my invention;

Fig. 2 is a rear elevation with the camera back open or removed to reveal interior parts, the mechanism being adjusted to a position ready for exposure;

Fig. 5 is an enlarged horizontal section taken substantially on the line 5—5 of Fig. 2;

Fig. 6 is a transverse vertical section taken substantially on the line 6—6 of Fig. 5;

Fig. 7 is a plan view of the controlling mechanism for the film feeding devices and its carrying plate detached from the bottom of the camera;

Fig. 8 is a plan view looking upward of the bottom of the camera as it appears with the plate shown in Fig. 7 detached therefrom;

Figure 1:
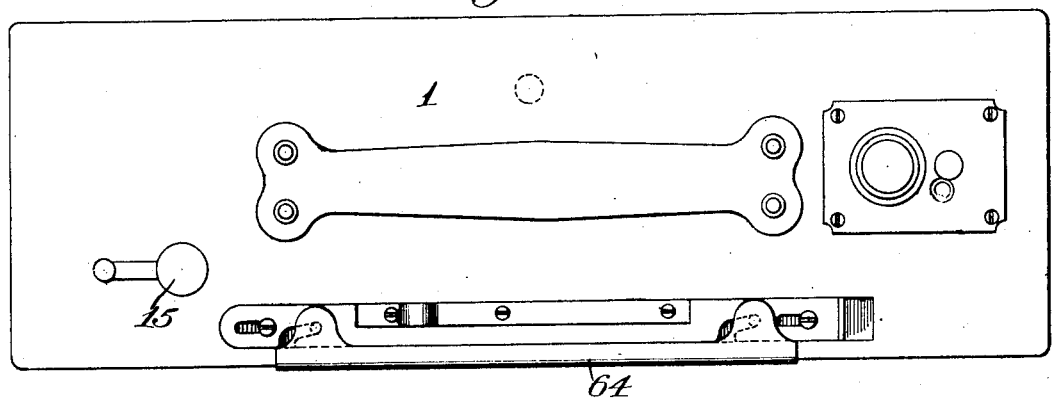
Figure 2:
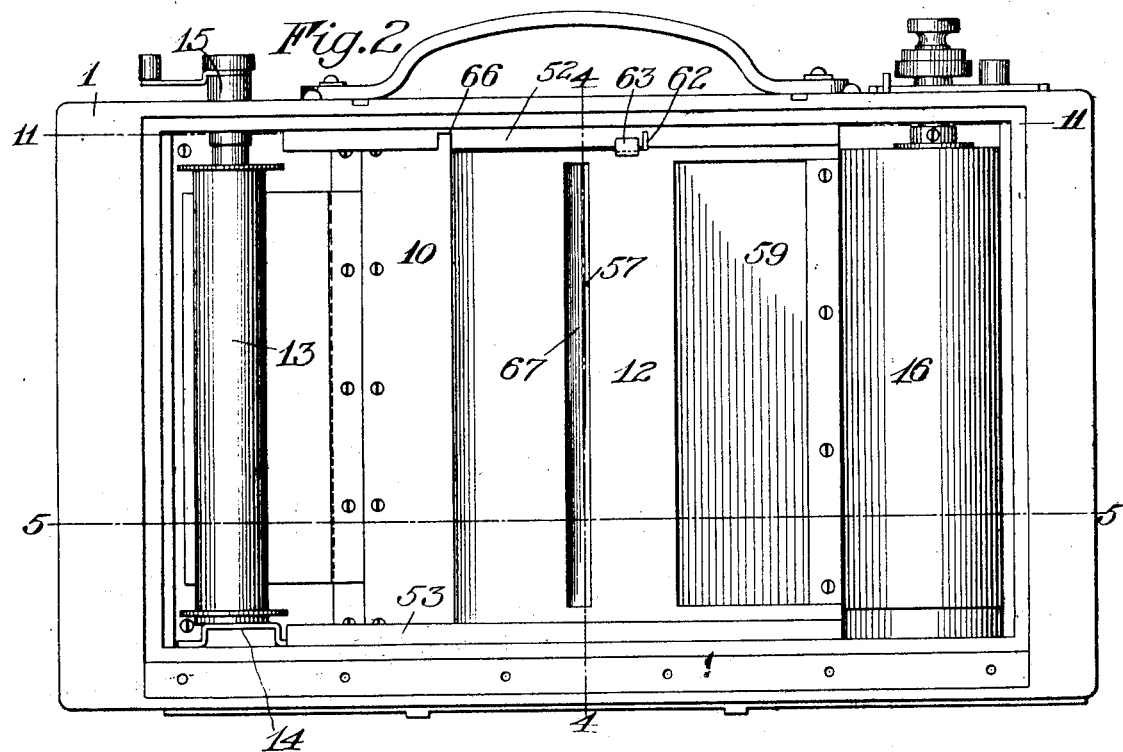
Figure 3:
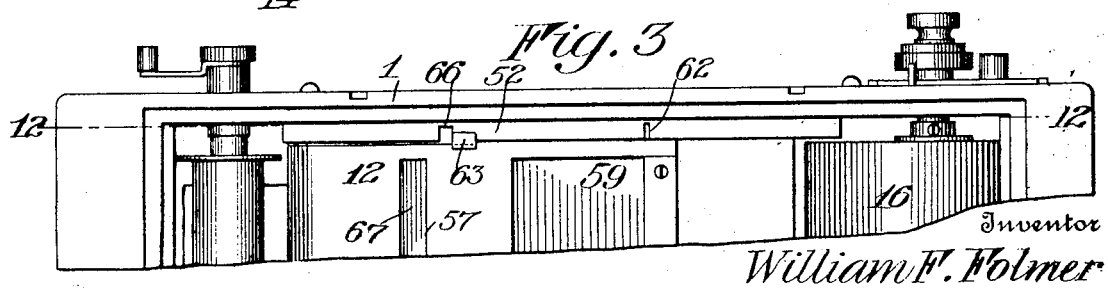
Fig. 3 is a similar but fragmentary view showing the parts adjusted for focusing.

Fig. 11 is a horizontal section on the line 11—11 of Fig. 2 with the camera back closed, and Fig. 12 is a similar section on the line 12—12 of Fig. 3 showing the impossibility of closing the back when the parts are in the position assumed in said last mentioned figure.

Similar reference numerals throughout the several figures indicate the same parts.

As before indicated, the camera illustrated in the present instance requires to be mounted on a special support having facilities for rotating it slowly but as there is no importance to be attached herein to the connection between the automatic film feeding devices and the rotating mechanism and the present invention, so far as it modifies these features, relates to the film feeding devices *per se* nothing more than the camera itself requires illustration or explanation and hence the special support has not been shown.

Figure 4:
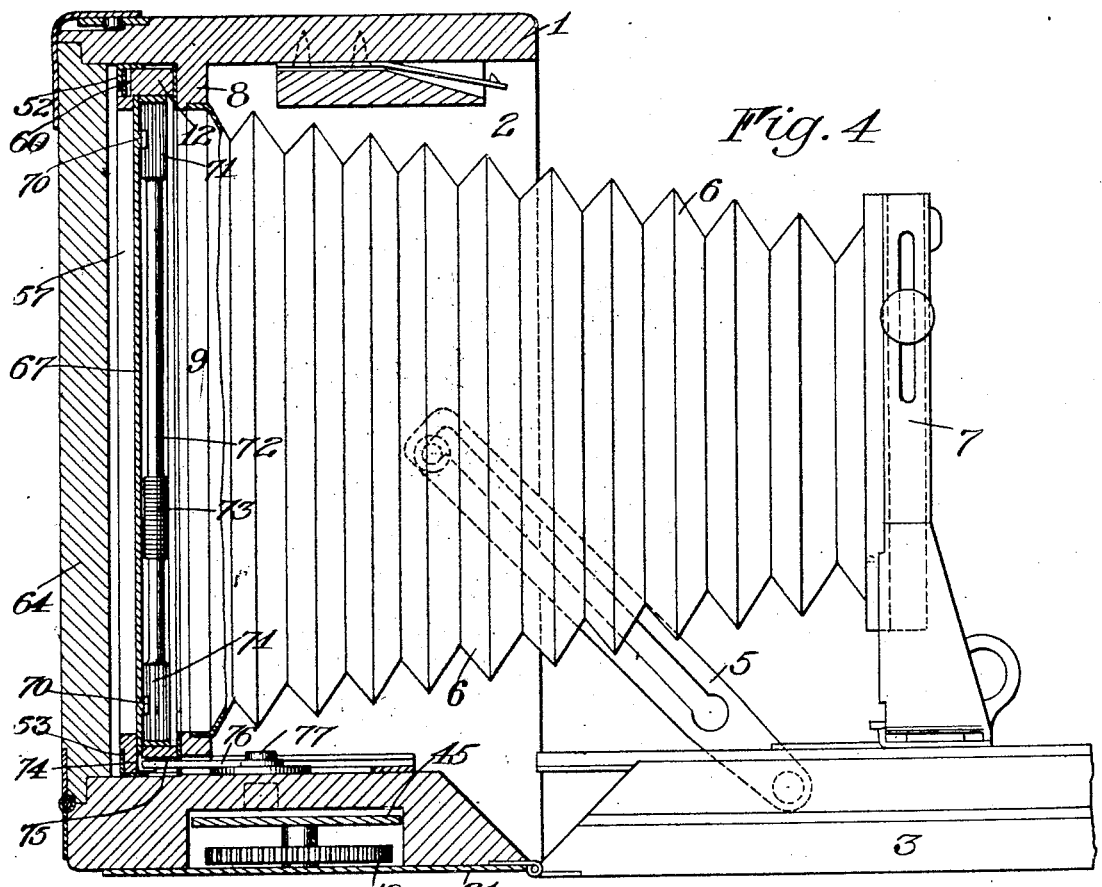
Fig. 4 is a longitudinal section taken substantially on the line 4—4 of Fig. 2.

The camera of the present embodiment is a folding camera comprising a body or casing 1 (Fig. 4) containing a bellows chamber 2 closed at the front by the usual door 3 which forms the camera bed when extended and held by the links 5. The bellows 6 is connected to the front 7 at its forward end and at its rear to the inner frame 8 so that an exposure chamber 9 is formed within the camera. The rear wall 10 of the exposure chamber is extended over farther than in the ordinary camera as the aperture 11 concentric with the axis of the lens is not required to be very large. In rear of the wall 10 is a diaphragm 12 having a smooth flat rearward surface which forms a guide and support for the film or web of sensitized material that is fed across the cone of light from the lens. The manner in which this diaphragm 12 is mounted will be hereinafter described.

The film feeding mechanism does not require minute description for present purposes. The film is fed from a supply spool or reel 13 mounted on a trunnion 14 (Fig. 5) at its lower end and a spindle 15 (Fig. 2) at its upper end across the diaphragm 12 to a winding roll or hollow drum 16 of relatively great diameter arranged at the other end of the camera. This drum is impelled at the proper speed by a suitable spring motor 17 arranged below it. In order to regulate this winding speed in accordance with the rotative speed of the camera or the rapidity of the exposure and also to start and stop the motor, the mechanism best shown in Figs. 5, 6, 7 and 10 is employed. A gear 18 on the motor shaft is connected by a chain of intermediate gearing 19 with a familiar type of centrifugal governor comprising a spindle 20 supported at its lower end in a plate 21 that carries the gearing and, in fact, practically all of this general mechanism being fastened to the bottom 22 of the camera body as clearly indicated in Figs. 7 and 8. The motor 17 is accommodated in a recess 23 in the bottom while the governor projects upwardly through a similar opening 24 and the upper end of the spindle 20 is journaled in a yoke bracket 25 secured to the bottom 22 adjacent to the opening 24. Springs 26 supporting the weights 27 are connected at their upper ends to a sleeve 28 fixed to the spindle 20 and at their lower ends to a sliding disk 29. As the speed of the governor, which is driven through a gear 30 at the lower end of its spindle meshing with the gearing 19, increases, the disk 29 is drawn by centrifugal force upwardly against a brake shoe 31 the friction of which retards the disk. The brake shoe has a toothed stem 32 guided in a bracket 33 and coöperating therewith is a gear 34 on a transversely extending shaft 35 (Fig. 7) which shaft is journaled in the bracket and in a plate 36 secured to the outer face of the end wall of the body 1. Exteriorly of the plate 36 the shaft carries an operating arm and indicator 37 that may be moved across a suitable scale and in so doing the shaft is rotated and the brake shoe 31 caused to halt the disk 29 and hold it to a greater or less speed as required.

For starting and releasing the motor and gearing an endwise movable brake rod 38 guided in studs 39 on the plate 21 is provided with a brake shoe 40 at one end, which shoe normally bears against a disk 41 on the governor spindle 20 under the influence of a spring 42 and holds the whole mechanism from turning. To release this friction brake 40 against the tension of its spring 42 a controlling shaft 43 is provided journaled in brackets 44 on a plate 45 that parallels the plate 21 primarily for supporting the other ends of the studs on which the gears 19 turn. An extension 46 of this shaft 43 has a clutch connection therewith at 47 for convenience in assembling (the shaft 43 being carried with the plate 21 and the rest of the mechanism) and this extension is journaled in a plate 48 also mounted on the outer face of the body 1 and terminates in a key 49. When the shaft is turned by means of the key, a cam 50 thereon (Fig. 10) engages a pin 51 on the brake rod 38 and retracts the brake shoe 40 from the disk 41, allowing the governor and the whole mechanism to start its motion.

To return to the diaphragm 12 at the rear of the exposure chamber 9, this preferably comprises a frame slidable in guideways 52 and 53 at the top and bottom, respectively, of the camera body, which guideways hold the diaphragm against the rear face of the rear wall 10 of the exposure chamber and stops 54 and 55 on the said wall limit its movements in the two directions (Fig. 5). When a plate 56 on the diaphragm engages stop 54, the diaphragm is stopped in such a position that an elongated exposure aperture 57 therein is brought to operative position in front of the opening 11 and in the optical axis of the camera. This is its position when the camera is working and the film is progressively exposed as it is drawn across this aperture 57 along the rear face of the diaphragm. At the same time, a plate 57ᵃ on the latter is in engagement with stop 55 but when the diaphragm is shifted to the left from the position shown in Fig. 5 until halted by the inturned ends 58 of the guides 52 and 53, a ground glass or other focusing screen 59 carried in the diaphragm is brought into operative position behind the opening 11 in the optical axis of the camera to select the view and focus the lens. Of course, the film strip is not threaded across from the feed spool 13 to the winding drum 16 until this focusing operation is over. When the diaphragm is shifted to the positions shown in Figs. 2 and 5 so that the exposure aperture 57 becomes operative, it is locked by a spring latch 60 (Figs. 5 and 12) secured to the diaphragm at 61 and snapping automatically into a notch 62 in the guide 52 from which it may be released by depressing an ear 63 on the latch projecting from the exterior of the guide.

In order to prevent the operator, after he has focused the subject, from leaving the ground glass or focusing screen 59 in the optical axis instead of shifting the diaphragm to bring the exposure opening 57 into operative position before threading his film across and starting the exposure, I provide means whereby the rear of the camera cannot be closed until the diaphragm is properly positioned. To this end, the camera back indicated at 64 in Figs. 5, 11 and 12 is provided with a forwardly extending pin 65 that, in the present instance, projects through an opening 66 (Fig. 2) in the guide 52 into the path of the diaphragm 12 when the back is in closed position. Thus, when the exposure aperture 57 is in operative position as in Figs. 2 and 11, the diaphragm is so far to the right that the pin 65 may may freely enter the opening 66 free of the diaphragm and the back closed tight. If on the other hand, the ground glass 59 is in operative position, the diaphragm 12 is so far to the left that it blocks the opening 66 and the pin 65 so that the back 64 cannot be closed beyond the projecting position shown in Fig. 12, whereat the operator knows the omission he has made and rectifies it before proceeding further.

Figure 9:
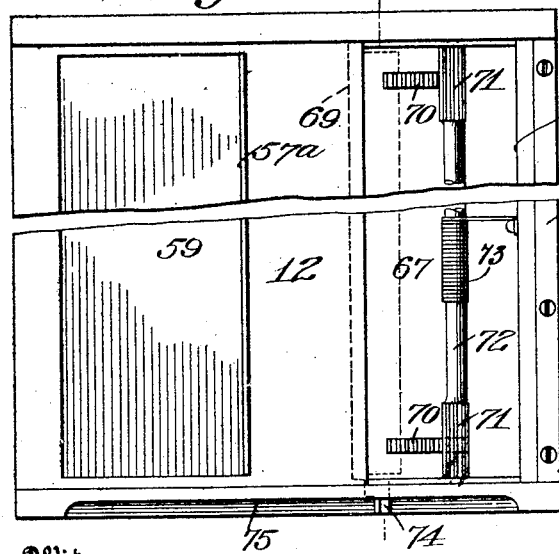
Fig. 9 is a front elevation of the diaphragm at the rear of the camera that carries the focusing screen and the exposure aperture, the same being shown detached and with an intermediate portion broken away.
Figure 10:
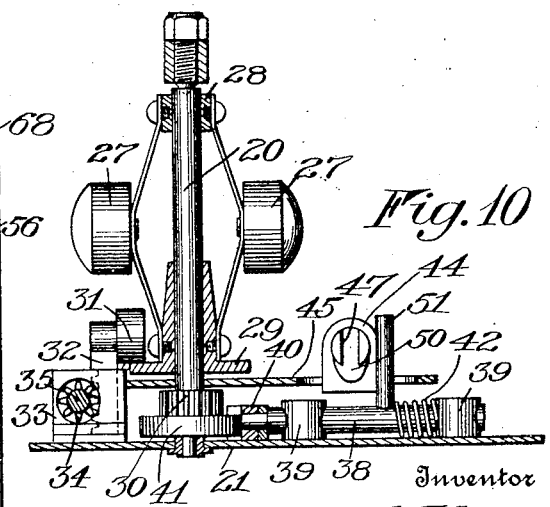
Fig. 10 is a central section through the governor of the film feeding mechanism taken substantially on the line 10—10 of Fig. 7;

A further feature of my invention consists in providing the diaphragm 12 with a safety cover 67 which is not opened except when the controlling key 49 is turned. This cover is preferably in the form of a sliding plate guided in a recessed portion 68 of the diaphragm at one side of the aperture 67 and seating, when closed, in a groove 69 in the other side of the aperture. The plate is provided at both top and bottom racks 70 (Fig. 9) with which mesh gears 71 at the top and bottom ends respectively, of a parallel shaft 72 journaled in the diaphragm and coiled about which is a spring 73 having a normal tendency to rotate the shaft and drive the cover 67 into closed position. The cover has a projecting portion 74 at its lower end exposed on the lower edge of the diaphragm 12 which is cut away at 75 for this purpose and this projection is adapted to be engaged by an arm 76 of a bell crank lever pivoted at 77 to the floor of the bellows chamber 2 and projecting through a slot in the frame 8. The other arm 78 of the bell crank is bifurcated so as to be moved in two directions by an arm 79 on the shaft 43 of the controlling key 49 which arm 79 projects through an opening 80 in the bottom of the camera body. It will thus be seen that every time the key 49 is operated to retract the brake rod 38 and start the film feeding mechanism, the safety cover 67 will be automatically withdrawn and an exposure will be assured.

It will be observed that inasmuch as there is merely a contact connection between the bell crank 76 and the safety cover which is set up when the diaphragm 12 is moved to the extreme right to bring the exposure aperture 67 into operative position, this connection is not interfered with when the diaphragm is shifted to bring the focusing screen 59 into operative position.

The purpose of the shaft 72 and its gearing with the safety cover 67 at both ends is to give a steady sliding movement to the cover and prevent it from binding even though the actuating pressure from the bell crank 76 is exerted only at one end.

I claim as my invention:

1. In a panoramic camera, the combination with an exposure chamber and automatic film feeding devices, of a diaphragm at the back of the exposure chamber across which the film is fed by the feeding devices, said diaphragm being provided with a focusing screen and with an exposure aperture and adapted to be shifted so that said screen or aperture may be brought, selectively, into the optical axis of the camera.

2. In a panoramic camera, the combination with an exposure chamber and automatic film feeding devices, of a sliding diaphragm at the back of the exposure chamber across which the film is fed by the feeding devices, said diaphragm being provided with a focusing screen and with an exposure aperture fixed relatively to each other and either of which may be shifted, selectively, into the optical axis of the camera by a sliding adjustment of the diaphragm.

3. In a panoramic camera, the combination with an exposure chamber and automatic film feeding devices, of a shiftable diaphragm at the back of the exposure chamber provided with a focusing screen and with an exposure aperture, and serving as a guide or table across which the film is stretched when fed by the feeding devices in the focal plane of the camera.

4. In a panoramic camera, the combination with an exposure chamber, of a focusing screen movable into and out of a position in the optical axis of the camera, a back for the camera adapted to be opened and closed, and means preventing the closing of the back when the focusing screen is in operative position in the optical axis.

5. In a panoramic camera, the combination with an exposure chamber and automatic film feeding devices, of a diaphragm at the back of the exposure chamber across which the film is fed by the feeding devices, said diaphragm being provided with an exposure aperture and movable so that the aperture may be shifted into and out of operative position in the optical axis of the camera, a back for the latter adapted to be opened and closed and means preventing the closing of the back when the exposure aperture is not in its said operative position.

6. In a panoramic camera, the combination with an exposure chamber and automatic film feeding devices, of a shiftable diaphragm at the back of the exposure chamber provided with a focusing screen and with an exposure aperture either of which may be shifted, selectively, into operative position in the optical axis of the camera, a back for the latter adapted to be opened and closed and means preventing the closing of the back when the exposure aperture is in inoperative position.

7. In a panoramic camera, the combination with an exposure chamber and automatic film feeding devices, of a shiftable diaphragm at the back of the exposure chamber across which the film is fed by the feeding devices, said diaphragm being provided with a focusing screen and with an exposure aperture either of which may be shifted, selectively, into operative position in the optical axis of the camera, a back for the latter adapted to be opened and closed and means preventing the closing of the back when the exposure aperture is in inoperative position and comprising a projection on the back arranged to be blocked by the diaphragm when the focusing screen is in operative position.

8. In a panoramic camera, the combination with an exposure chamber and a shiftable diaphragm at the back thereof having an exposure aperture therein movable into and out of an operative position in the optical axis of the camera as the diaphragm is shifted, of mechanism for automatically feeding film across the rear face of the diaphragm, a safety cover for the exposure aperture and a controlling device for the feeding mechanism connected to also operate the safety cover when the exposure aperture is in operative position.

9. In a panoramic camera, the combination with an exposure chamber, a diaphragm at the back thereof having an exposure aperture therein, and mechanism for automatically feeding film across the rear face of the diaphragm, of a sliding safety cover for the aperture, a shaft extending parallel therewith and geared with the same at both ends, and an operating member for driving the cover and shaft connected to one of said members at only one of its ends.

10. In a panoramic camera, the combination with a body, a bellows and a front forming an exposure chamber, of a diaphragm at the back of the exposure chamber having an exposure aperture therein, mechanism for automatically feeding film across the rear face of the diaphragm, a sliding safety cover for the aperture in the diaphragm, a bell crank lever pivoted exteriorly of the exposure chamber and bellows and arranged to actuate the safety cover, and an operating member for oscillating the bell crank lever.

11. In a panoramic camera, the combination with an exposure chamber, a diaphragm at the back thereof having an exposure aperture therein, and mechanism for automatically feeding film across the rear face of the diaphragm and embodying a brake, of a safety cover for the aperture, a bell crank lever arranged to actuate the same, and a rotary operating member for oscillating the crank and actuating the brake.

WILLIAM F. FOLMER.

Witnesses:
 AGNES NESBITT BISSELL,
 RUSSELL B. GRIFFITH.